C. O. DUFFY.
PROCESS OF PRODUCING TIRE PATCH MATERIAL.
APPLICATION FILED MAY 6, 1919.
1,339,696. Patented May 11, 1920.
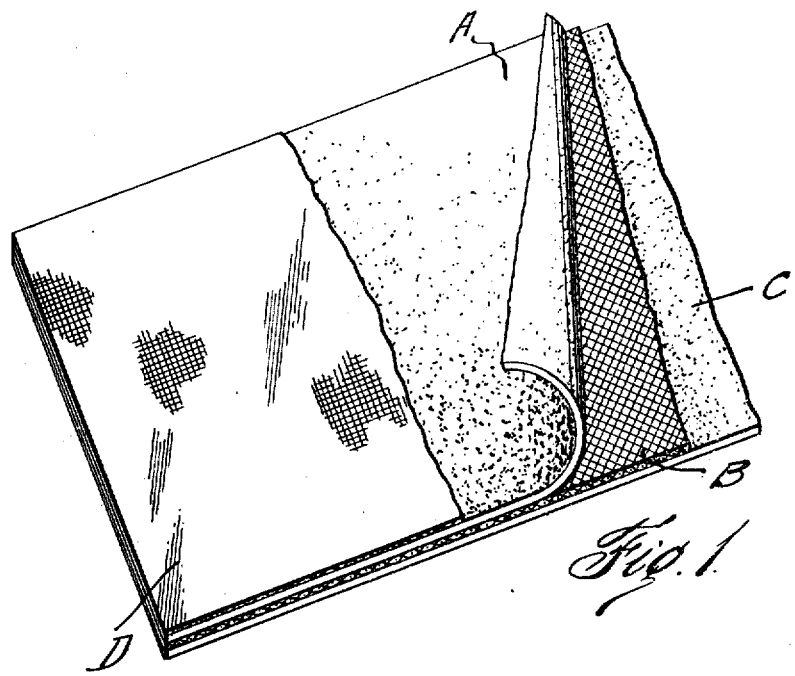
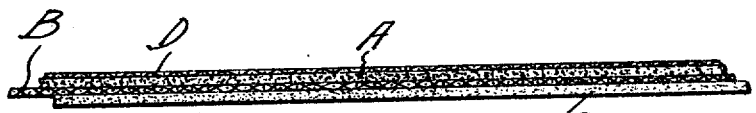
Inventor
C. O. Duffy,
By Jack D. Ashley,
Attorney

UNITED STATES PATENT OFFICE.

CLARENCE O. DUFFY, OF DALLAS, TEXAS.

PROCESS OF PRODUCING TIRE-PATCH MATERIAL.

1,339,696.  Specification of Letters Patent.  Patented May 11, 1920.

Application filed May 6, 1919. Serial No. 295,198.

*To all whom it may concern:*

Be it known that I, CLARENCE O. DUFFY, a citizen of the United States, residing at Dallas, in the county of Dallas and State of Texas, have invented certain new and useful Improvements in Processes of Producing Tire-Patch Material, of which the following is a specification.

This invention relates to new and useful improvements in tire patches and processes of producing the same.

There are certain features which are highly desirable in a tire patch among which are elasticity whereby the patch conforms to the contour of the tube and also lends itself to the distortions of the latter; the quality of being waterproof whereby its layers will not separate when wet; and an efficient adhesive layer or side which may be secured to the tube in a substantial manner.

The purpose of my invention is to attain these and other highly desirable results and I do so by means of a process which involves the impregnating of an elastic fabric with rubber and then curing the same under pressure; then applying raw rubber on one side of the fabric and vulcanizing; and then applying a rubber compound to the other or adhesive side and then cooking or curing the same to a certain degree.

The patch produced has a rubber filled fabric which will not absorb water by capillary attraction and which is bonded to its rubber layers on each side by means of its rubber filler. The unvulcanized layer has qualities peculiar to itself and is unlike the usual unvulcanized layer because it is composed of a compound and does not depend upon its adhesive properties to attach itself to the tube.

This invention will be more readily understood from a reading of the following specification and by reference to the accompanying drawings, in which an example of the invention is shown and wherein:

Figure 1 is a view showing a patch material composed of layers produced in accordance with this invention, some of the layers being partially stripped off and portions removed, and Fig. 2 is an edge view of the material.

In the drawings A designates the inner layer of a patch, said layer being applied to the inner tube. A fabric layer B is interposed between the inner layer and an outer layer C. A protective sheet or layer D is attached to the face of the layer A.

In manufacturing the patch material the fabric layer or sheet B is produced first. A loosely woven fabric capable of stretching in all directions is used. This fabric is impregnated with rubber by coating with plastic rubber and then curing by steam vulcanizing under a pressure of several hundred pounds, 800 pounds having been found satisfactory. The fabric layer thus treated will have every fiber coated with rubber; it will be rubber filled and waterproof all the way through.

To one side of the fabric layer a layer of raw rubber of the desired thickness is applied; this layer is steam vulcanized in the usual manner and the layer C produced.

One of the very important steps is the production of the layer A. I prepare a compound of raw rubber, and vegetable matter in suitable proportions and in the form of a sheet. This sheet of compound rubber is placed on the other side of the fabric layer and cooked by the vulcanizing process. The work must be inspected during this cooking process because the vulcanizing must not become complete. For instance if 25 minutes are required to completely vulcanize the usual patch material, the layer A must be removed before the expiration of this period.

The protective layer D of glazed or other fabric is applied to the face of the layer A which latter is sufficiently adhesive to adhere to the layer D. The layer A is soft and plastic but I do not depend upon its adhesiveness to secure the patch to the tube.

In repairing a tube a patch of the desired size and shape is cut from the material and the protective layer D removed. It is only necessary to roughen and clean the tube by an abrading material such as sandpaper, but no cleaning fluid such as gasolene is used nor is such desirable. Suitable air drying rubber cement such as is now commonly manufactured, is applied to the tube and the face of the layer A applied thereto. The specially treated layer A readily adheres and the repair is complete. This patch does not depend upon frictional heat for vulcanizing (so called) it on the tube. After it is once applied it cannot be dislodged or creep. The work is quickly done and a permanent patch is had.

It will be seen that the fabric layer B being highly elastic will permit the patch to stretch in any direction and further said fabric being waterproof will not absorb water and shed its layers. This rubber filled fabric layer forms a better bond between the rubber layers and strengthens the patch because it is preserved by its rubber filling. The layer A is most highly important as both its structure and its curing add to the effective cementing of the patch to the inner tube.

This invention is in some respects an improvement on my Letters Patent Number 1,290,128, issued January 7, 1919, in so far as the disclosure is concerned, but has nothing in common with the bevel edge element of the claim. The specification of said Letters Patent does not disclose the present process and is believed to cover only a fabric layer interposed between rubber layers which was broadly old in the art when the patent was applied for.

What I claim is:

The herein-described process of producing a tire patch material, which consists in applying a layer of raw rubber to one side of a fabric impregnated with vulcanized rubber, subjecting such layer of raw rubber to the action of heat to completely vulcanize the same, subsequently applying a rubber compound containing raw rubber and an adhesive to the opposite side of the fabric, and then subjecting such rubber compound to the action of heat for a period short of the time necessary to completely vulcanize the raw rubber whereby the raw rubber in the compound is in a partly cured state.

In testimony whereof I affix my signature.

CLARENCE O. DUFFY.